3,379,774
PROCESS FOR THE PREPARATION OF PHENOL FROM BENZOIC ACID
Aldo Forni, Galliate, and Luigi Cavalli, Novara, Italy, assignors to Montecatini Edison S.p.A., Milan, Italy, a corporation of Italy
No Drawing. Filed May 15, 1964, Ser. No. 367,876
Claims priority, application Italy, May 16, 1963, 10,112/63
1 Claim. (Cl. 260—621)

Our invention relates to an improved process for the production of phenol from benzoic acid.

It is known that phenol is formed by treating an aromatic carboxylic compound with an oxidizing gas in the presence of soluble copper salts at a temperature of 200–250° C. The most suitable aromatic carboxylic acids belong to the benzene class and have at least one free position in the benzene ring, next to the carboxyl. In general, the process is applied to the production of phenol from benzoic acid.

The preferred copper salt is the compound obtained by dissolving the copper oxide in the acid to be oxidized. The reaction is stimulated by the presence of promoters (salts or oxides or hydroxides of Mg, Na, K, Li, and Ba) which accelerate the reaction and increase the yield of phenol (U.S. Patent 2,727,926 and Ind. Eng. Chem. 53 (1961), No. 10, pages 805 et seq).

It is also known that in the course of the above-mentioned phenol-forming reaction, there is a simultaneous formation of high molecular weight products generally known as pitches. These pitches represent an appreciable loss in reaction yield. Hence, it has always been endeavored to reduce the pitch formation. At any rate, for avoiding their accumulation in the reactor and affording a continuous run, the reaction liquid must be continually drained and then treated for recovery of the useful products and for separation of the pitches to be eliminated. It is obvious, therefore, that the possibility of reducing the formation of pitches with respect to the phenol produced would constitute a substantial improvement; and it is an object of our invention to achieve such improvement.

We have discovered that the formation of pitches as referred to the phenol produced, can be appreciably diminished by adding a manganese salt to the reaction mixture comprising the catalyst and the promoter.

Probably the action of the manganese salt is due to the fact that manganese, a metal having variable valence, acts as the carrier of oxygen with respect to copper; it blocks the oxygen dissolved in the liquid phase, thus hindering its action on the phenol present. In fact, the formation of pitches can be ascribed to this action. Subsequently the manganese passes from the state of higher valence to the lower state, giving its charges off to the copper which thus can act again as catalyst.

The copper compound preferably employed as the catalyst is cupric oxide which is used in a concentration of 1–2% with respect to the reacting mixture; and magnesium oxide is preferred as the promoter and is also used in a concentration of 1–2% in the mixture. The manganese compound is added to the reacting mixture in amounts equal to a concentration of 1–4% (as $Mn_2O_3$) of the same mixture. Whatever salt of copper, magnesium or manganese is used, their amount, expressed in oxide, must be comprised within the above-given limits.

In other respects, the process is carried out according to the known technique, applying a temperature of 200–250° C. at atmospheric pressure, with air as the oxidizing gas, and in the presence of steam.

The following examples are intended to illustrate the invention without limiting it in any way.

Example 1

Into a reaction vessel made of glass and having 40 mm. diameter and 500 mm. height were charged: G.
Benzoic acid _____ 500
CuO _____ 5
MgO _____ 5

The reactor was maintained at 230° C. by means of a bath of fused salts. It was equipped with a reflux head which was maintained at the temperature of 140° C. in order to recycle back to the reactor most of the benzoic acid entrained by the reaction gases.

After leaving the head, the gases were cooled with $H_2O$ at room temperature so that the phenol produced was obtained as a condensate.

The gaseous feed consisted of an air current (47 l./h.) mixed with steam (10 g./h.).

During the run, benzoic acid was fed into the reactor so as to maintain the level constant. After 9 hours the process was terminated and both the condensate and the reaction residue were collected.

After analyses were carried out, separating the phenol and the pitches produced, the following values were obtained: G.
Phenol produced _____ 189.9
G. of pitches/100 g. of phenol _____ 19.2

Example 2

The process was conduced under the same conditions as in Example 1, with the only difference that 15 g. of $Mn_2O_3$ were added to the reaction liquid. The following results were obtained: G.
Phenol produced _____ 203.8
G. of pitches/100 g. of phenol _____ 4.46

We claim:
1. In the process of preparing phenol from benzoic acid by oxidation in the liquid phase in the presence of 1–2% by weight of the reaction mixture of a copper oxide catalyst and 1–2% by weight of the reaction mixture of a magnesium oxide catalyst promoter, the improvement which comprises carrying out the reaction in the presence of 1–4% by weight of the reaction mixture of manganese oxide to reduce pitch formation.

References Cited
UNITED STATES PATENTS
2,727,926    12/1955    Keading et al. _____ 260—621

LEON ZITVER, Primary Examiner.
BERNARD HELFIN, Examiner.
B. M. HELFER, H. ROBERTS, Assistant Examiners.